United States Patent [19]

Frame

[11] Patent Number: 4,843,308
[45] Date of Patent: Jun. 27, 1989

[54] ELECTRONIC INTEGRATOR CIRCUITRY FOR PIEZOELECTRIC AND OTHER SENSORS

[75] Inventor: John M. Frame, Pullman, Wash.

[73] Assignee: Washington State University Research Foundation, Inc., Pullman, Wash.

[21] Appl. No.: 113,815

[22] Filed: Oct. 26, 1987

Related U.S. Application Data

[63] Continuation-in-part of Ser. No. 866,875, May 23, 1986, Pat. No. 4,703,217.

[51] Int. Cl.$^4$ .................... G01R 19/26; G01B 7/18; H01L 41/08
[52] U.S. Cl. .................... 324/120; 73/768; 310/338; 324/119; 377/45
[58] Field of Search .................... 324/111, 119, 120; 377/45; 73/768, 862.48, 862.64; 310/329, 338

[56] References Cited

U.S. PATENT DOCUMENTS

| | | | |
|---|---|---|---|
| 3,332,506 | 7/1967 | Bradfield | 177/210 |
| 3,541,849 | 11/1970 | Corbett | 73/141 |
| 3,843,873 | 10/1974 | Beville et al. | 377/45 |
| 4,085,349 | 4/1978 | Farstad | 310/319 |
| 4,239,088 | 12/1980 | Check et al. | 310/338 |

OTHER PUBLICATIONS

Hennig et al., "A Piezoelectric Method of Measuring the Vertical Contact Stress Beneath the Human Foot," *Journal of Biomedical Eng.*, vol. 4, Jul. 1982, pp. 213–222.

*Primary Examiner*—Ernest F. Karlsen
*Attorney, Agent, or Firm*—Wells, St. John & Roberts

[57] ABSTRACT

A digital integrator for sensors which takes a time varying current or charge flow signal and converts it into a proportional voltage varying signal. The voltage varying signal is then preferably passed through an active full wave rectification subcircuit to provide an absolute value of the time varying voltage signal. The voltage signal also is analyzed by a zero crossing detector. The absolute value signal is converted into a proportional frequency varying signal which is counted either positively or negatively to produce an integral of the current flow with time. The integrator can be used with sensors such as piezoelectric crystals to indicate force on a real-time basis. The integrator is described as part of an animal hoof force detection system.

15 Claims, 9 Drawing Sheets

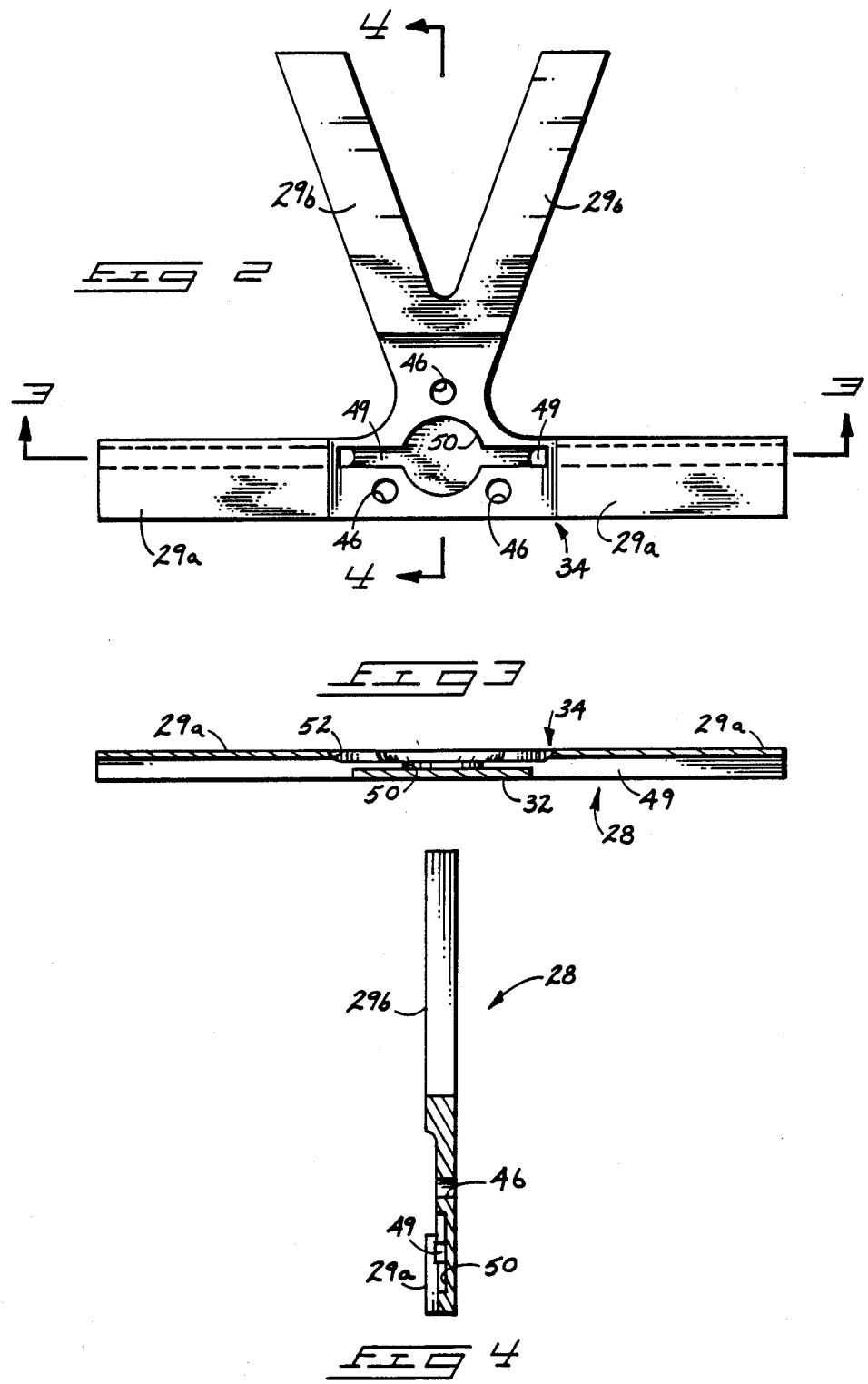

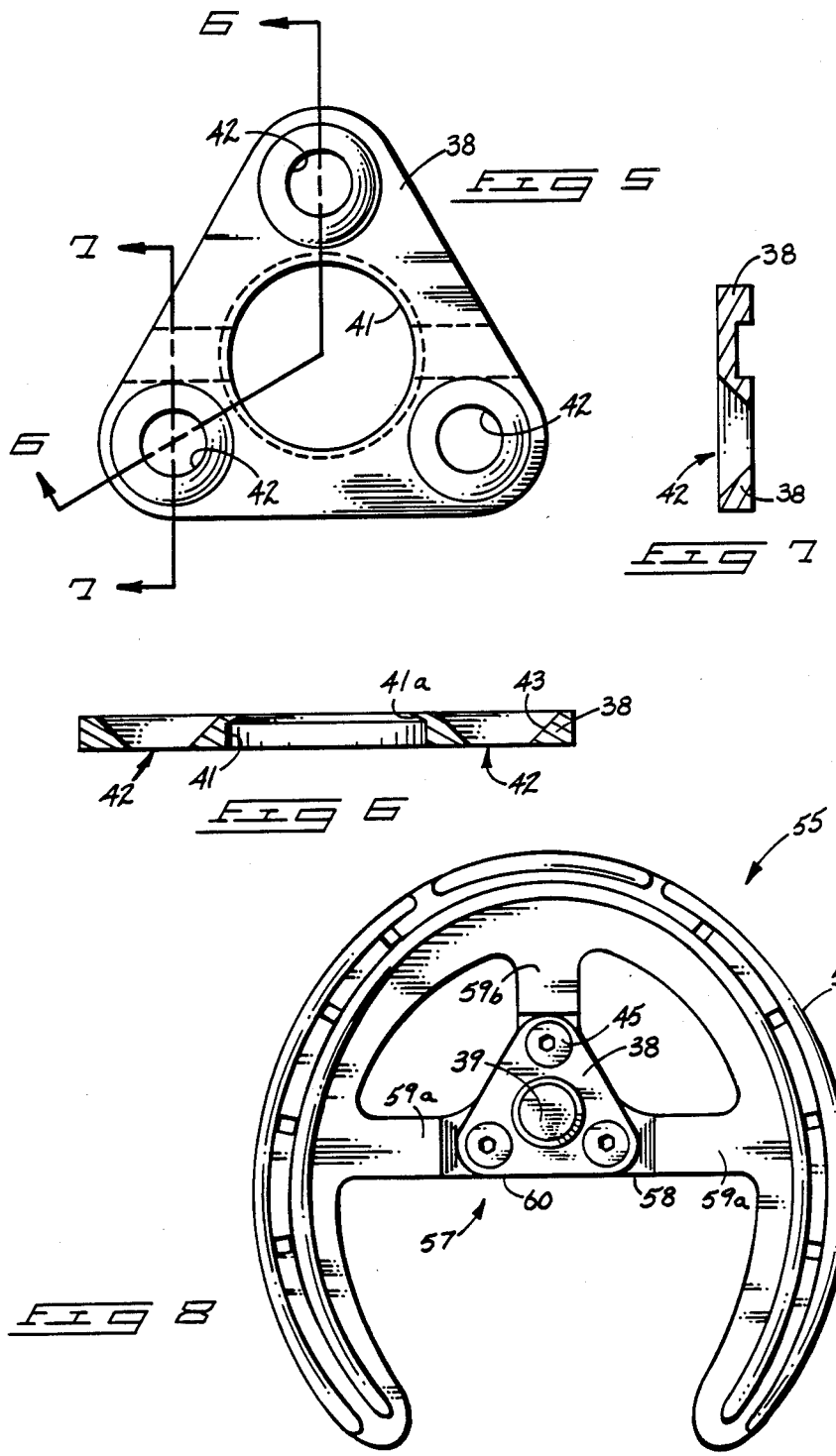

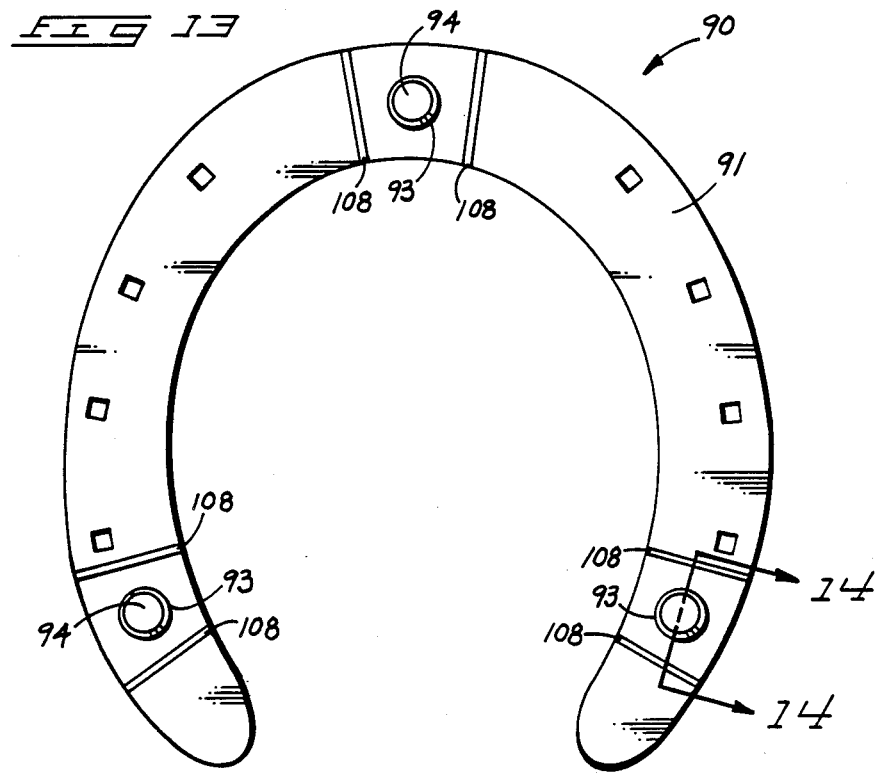
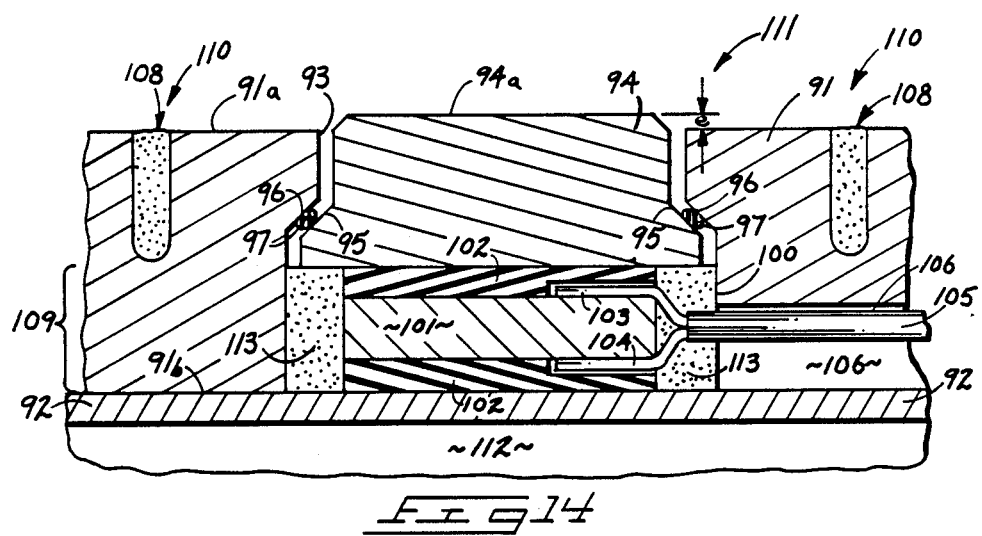

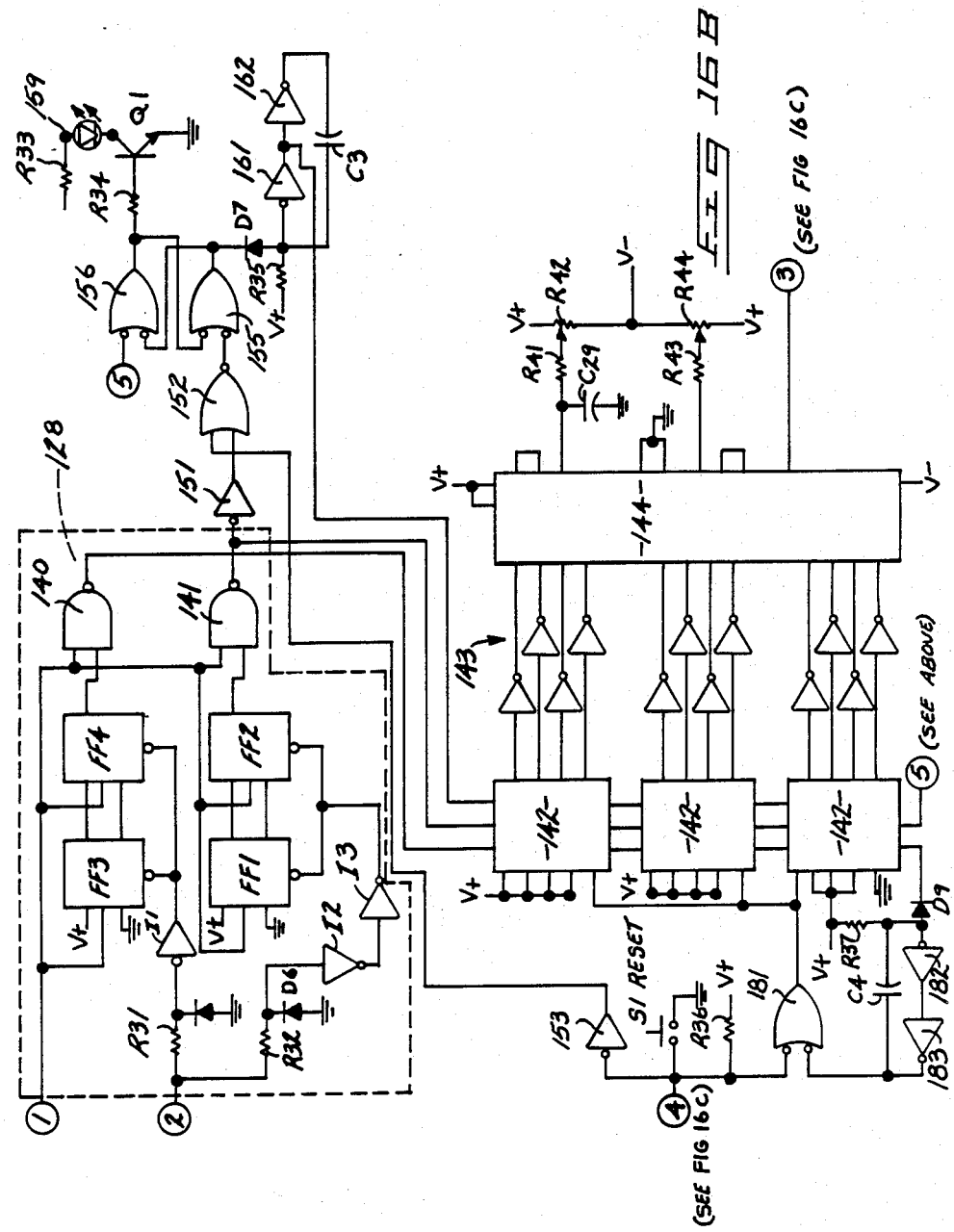

ELECTRONIC INTEGRATOR CIRCUITRY FOR PIEZOELECTRIC AND OTHER SENSORS

This is a continuation-in-part application from co-pending U.S. patent application Ser. No. 866,875, filed May 23, 1986, now U.S. Pat. No. 4,703,217, issued Oct. 27, 1987, and priority is claimed thereon.

TECHNICAL FIELD

The technical field of this invention is electronic sensor integrating circuits.

BACKGROUND OF THE INVENTION

It is widely recognized in horse racing that there is a relationship between lameness in horses and the type of track or other surface upon which the horse is running. Studies have been conducted which show that the greatest risk of lameness occurs in the left front leg of a horse going around the relatively sharp turns used in conventional horse racing tracks. It has further been discovered that horse tracks having more gradual curves and embanked track surfaces on the corners help to further reduce the risk of lameness. Other factors such as the resiliency of the track surface also affect the likelihood of lameness developing.

It has also been recognized by equestrians that variations in the properties of track surfaces can have a significant effect on racing times. Resiliency and other factors of track performance may also have significant effects on the effectiveness and efficiency of different types of track surfaces in strengthening horses.

In the veterinary and horse training fields it has further been recognized that information on the types and amounts of forces applied by the horse to the track are significant in better understanding of lameness, equine locomotion, and track performance. Previous researchers have utilized force detecting plates which are relatively easily installed in a track. A horse is run over the force plate and the amount of force applied by the horse's hoof is recorded. Use of force plates to detect and analyze locomotor forces has been found less than satisfactory. The relatively greater rigidity and hardness of the plate as compared to the track surface makes it uncomfortable for the horse to strike his hoof upon the surface during gaits faster than a trot. Accordingly, horses typically avoid force plates as soon as they have learned the position during experimental trials. Force plates are also limited by their inability to measure forces applied during successive strides. This prevents careful analysis of force variations which may be due to natural fluctuations in the animal's gait. Force plates have also been found undesirable because of the relative difficulty in achieving accurate results when the horse or other hoofed animal runs over the plate at a fast gait.

The research team of Frederick and Henderson sought to overcome some of the limitations of force plates using a specially designed force sensing horseshoe which was attached to a horse's hoof. The Frederick and Henderson horseshoe used a "hoof plate" which is connected to the hoof of the animal. A plurality of strain gauge washers were positioned between the hoof plate and a force plate using bolts. The force plate contacted the ground during running of the horse. Bolts connecting the force plate and hoof plate together were torqued to provide a preload on the washer-shaped strain gauge transducers through which the bolts extended.

The Frederick and Henderson force measuring horseshoe is disadvantaged by its use of two relatively rigid and heavy plates weighing in excess of normal horseshoes. The use of two plates spaced apart by strain gauge transducers also has a substantially greater height than a typical horseshoe. Scientific studies have shown that increased height and weight of horseshoes substantially affects the locomotion pattern of a horse using such shoes. Accordingly, it is not possible to accurately assess the forces applied by a horse or other hoofed animal during actual running conditions. Variations in the gait caused by relatively heavy or thick horseshoes also alters the anatomical motion of the horse's leg, thereby reducing the significance of studies using high speed photography.

The present invention provides animal hoof force detection systems using relatively lightweight shoe and transducer structures which can be used to reliably indicate the forces applied by hooves during free animal locomotion. The systems are advantageously carried on the animal so that no tether or cable impedes the range or type of surface over which the system can be used. The system further allows substantially continuous monitoring of one or more of the animal's hooves in order to identify the timing and magnitude of the ground contact forces applied by the animals hooves. Other advantages and objects of this invention will be apparent from the description given herein and the expertise of one of ordinary skill in the art.

BRIEF DESCRIPTION OF THE DRAWINGS

Preferred and alternative embodiments of the invention are shown in the accompanying drawings, in which:

FIG. 2 is a bottom plan view of portions of a force transducer mounting assembly forming a part of the shoe transducer assembly of FIG. 1, shown in isolation; portions of the force transducer mounting assembly included in FIG. 1 have been removed for clarity;

FIG. 3 is a sectional view taken along line 3—3 of FIG. 2;

FIG. 4 is a sectional view taken along line 4—4 of FIG. 2;

FIG. 5 is an enlarged plan view of a mounting ring shown in FIG. 1, shown in isolation;

FIG. 6 is a sectional view taken along line 6—6 of FIG. 5;

FIG. 7 is a sectional view taken along line 7—7 of FIG. 5;

FIG. 8 is a bottom plan view of an alternative hoof shoe force detection apparatus according to this invention;

FIG. 13 is a bottom plan view of a further alternative animal hoof shoe force detection assembly according to this invention;

FIG. 14 is a sectional view taken along line 14—14 of FIG. 13;

FIG. 16A—16C are electronic schematic diagrams showing a preferred signal processing and digital integration circuit useful in systems according to this invention.

DETAILED DESCRIPTION OF THE PREFERRED EMBODIMENTS

In compliance with the constitutional purpose of the Patent Laws "to promote the progress of science and useful arts" (Article 1, Section 8), applicant submits the following disclosure of the invention.

Figure 1:
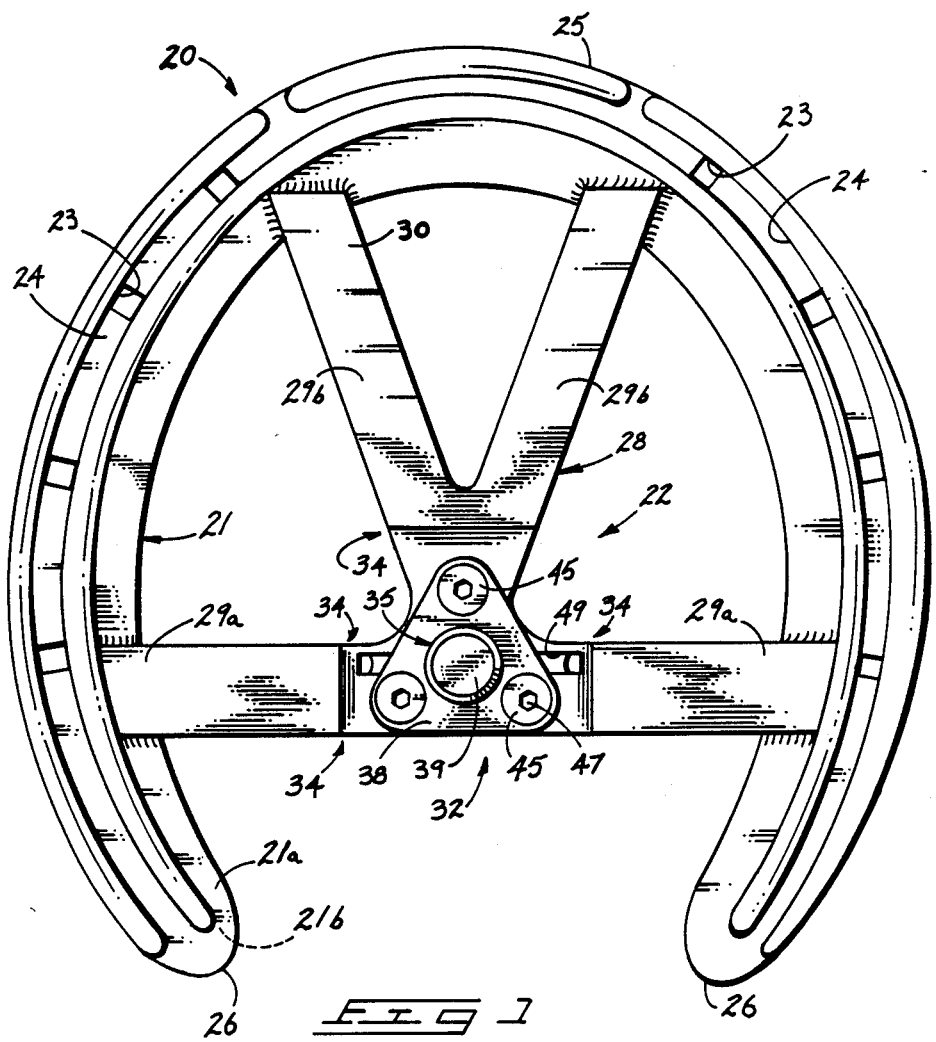
FIG. 1 is a bottom plan view of a preferred hoof shoe and transducer assembly according to this invention.

FIG. 1 shows a preferred horseshoe hoof force detection apparatus 20 according to this invention. Force detection apparatus 20 includes a shoe portion 21 and a force transducer mounting assembly portion 22. Shoe portion 21 can be made in a variety of configurations well known in the art of farriery. Such shoe portions can be constructed for use on horses or other hoofed animals for which hoof force or pressure information is desired. Shoe portion 21 has a ground-contacting surface 21a and a hoof-directed surface 21b. Shoe 21 is shown provided with a plurality of nail holes 23 extending through the shoe at a nail crease or fuller 24. Shoe 21 also has a toe 25 and heels 26.

The force transducer mounting assembly portion 22 includes a shoe spanning mount 28. Shoe spanning mount 28 includes a plurality of spokes 29. Spokes 29 have distal ends 30 which are connected to shoe 21 using a suitable means. The distal ends of spokes 29 are preferably either integrally formed with shoe 21 or else rigidly connected thereto such as by welding, as shown in FIG. 1. Spokes 29 include two lateral or side spokes 29a which extend approximately oppositely outward from a centrally located sensor mounting section 32. Spokes 29 also include two frontal spokes 29b which converge from distal ends 30 toward the sensor mounting section 32. Sensor mounting section 32 is preferably positioned over the frog of the animal hoof.

Spokes 29 and sensor mounting section 32 are preferably integrally connected at flexion joints 34. Flexion joints 34 can be formed in a variety of suitable structures which create increased flexibility while maintaining structural integrity. Flexion joints 34 allow the sensor mounting section 32 to maintain relative structural rigidity across the section because of the stress concentration at joints 34. This stress concentration causes limited flexing at the integral flexion connections 34 with spokes 29 in order to provide good face-to-face contact with the ground or other supporting surface (not shown) against which shoe structure 20 is forced by the animal's hoof. Flexion joints 34 also isolate center mounting section 32 preventing undesirable bending moments or other forces or stresses from being communicated to piezoelectric sensing assembly 35 mounted thereto.

Piezoelectric sensing assembly 35 is advantageous mounted to sensor mounting section 32 using a mounting ring 38 and a protective sensor cap 39. Sensor cap 39 is advantageously provided with a flange such as beveled flange 40 which is received within a cap receiving aperture 41 formed through mounting ring 38. Cap receiving aperture 41 is advantageously formed with a beveled portion 41a for receiving at least a portion of the beveled flange 40 of protective cap 39.

Mounting ring 38 is also provided with a plurality of mounting apertures 42 which are advantageously provided with beveled or countersunk side walls 43. Mounting apertures 42 are adapted to receive corresponding mounting bolts 45 therethrough. Mounting bolts 45 are threaded into mounting section receiving holes 46 (FIG. 2) formed in sensor mounting section 32. Bolts 45 are preferably provided with a conical or countersink head shape for being received by countersunk wall portions 43. Bolts 45 preferably include a socket 47 which can be hexagonal, square or otherwise shaped for transferring torque to bolts 45.

Shoe spanning mount 28 is advantageously provided with a sensor element receiving pocket 50 (FIG. 2). Sensor element receiving pocket 50 is advantageously cylindrical in shape having a flat bottom for supporting flat polar surfaces of piezoelectric sensor assembly 35. Shoe spanning mount 28 also advantageously includes wiring channels 49 which extend from pocket 50 outwardly for receiving wires from piezoelectric element 36 therethrough.

FIGS. 3 and 4 show that flexion joints 34 are advantageously formed by reducing a structural dimension such as the thickness of spokes 28. The reduced thickness occurs at a shoulder 52 which is advantageously provided with a radius so as to prevent unduly high stress concentration risers. Other alternative means for providing flexion joints will be apparent to those skilled in the art. Other alternative flexion joints will also be described herein.

FIG. 8 shows an alternative animal hoof force detection apparatus 55 according to this invention. Shoe-transducer mounting structure 55 includes an outer shoe portion 56 substantially as described above with respect to shoe portion 21. Structure 55 also includes a force transducer mounting assembly 57 which is cast, forged, or otherwise integrally formed with shoe portion 56. Force transducer mounting assembly 57 includes a shoe spanning mount 58 with lateral spokes 59a and toe spoke 59b. A sensor mounting section 60 interconnects the three spokes 59.

Force transducer mounting assembly 57 also includes a mounting ring 38, protective sensor cap 39, mounting bolts 45, and piezoelectric sensor assembly 35.

Figure 9:
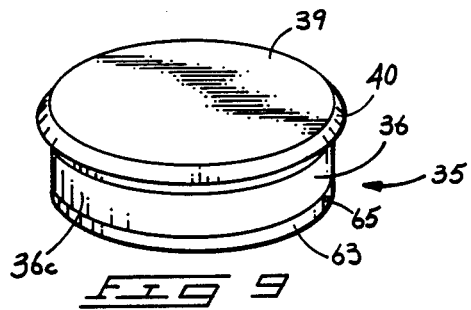
FIG. 9 is a perspective view of a piezoelectric element assembly useful with the embodiments shown in FIGS. 1 and 8.
Figure 10:
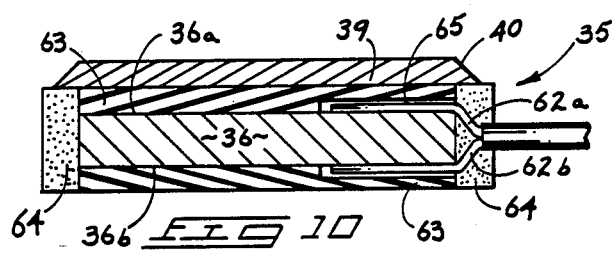
FIG. 10 is a longitudinal sectional view of the assembly shown in FIG. 9 with additional parts shown.

FIGS. 9 and 10 show a preferred piezoelectric sensor assembly 35 useful with the embodiments of FIGS. 1–8. Sensor assembly 35 includes a suitable piezoelectric sensing element 36. Piezoelectric sensing element 36 is preferably a ceramic piezoelectric element having poled faces 36a and 36b. Piezoelectric element 36 also preferably has a cylindrical peripheral surface 36c, although other alternative shapes are clearly possible. The poled first and second surfaces 36a and 36b, respectively, are advantageously provided with a metallic or other electrically conductive coating on faces 36a and 36b. Such electrically conductive coating allows electricity to flow from the entire poled faces and also allows electrically conductive wire leads 62a and 62b to be easily connected thereto. It is preferable for the positive pole of the piezoelectric element 36 to be oriented toward cap 39. Wire leads 62 are connected into the circuit of FIGS. 16A–16C as indicated therein.

Sensor assembly 35 also preferably includes a pair of dielectric disks 63 used to electrically insulate the poled surfaces of piezoelectric element 36. One disk 63 is between element 36 and protective cap 39. The other is between element 36 and a supporting surface such as the bottom surface of pocket 50. A non-conductive capsule 64 partially encloses the piezoelectric element assembly in order to securely position the assembly within pocket 50 or other mounting receptacles. Non-conductive capsule 64 can be formed from polyurethane, epoxy, or other suitable materials well known in the art.

Dielectric disks 63 are preferably provided with channels 65 for receiving the ends of wire leads 62. Wire leads 62 are preferably soldered to a metallic coating on poled faces 36a and 36b. Other alternative means for electrically connecting leads 62 to the poled faces of piezoelectric element 36 includes full face conductive layers or screens (not shown) and other means obvious to those skilled in the art.

Figure 11:
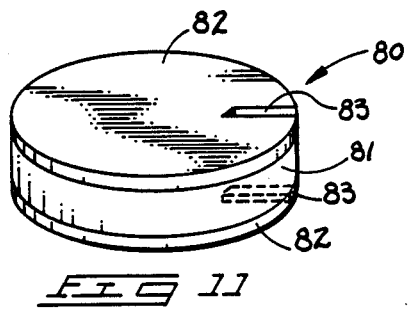
FIG. 11 is a perspective view of an alternative piezoelectric transducer assembly.
Figure 12:
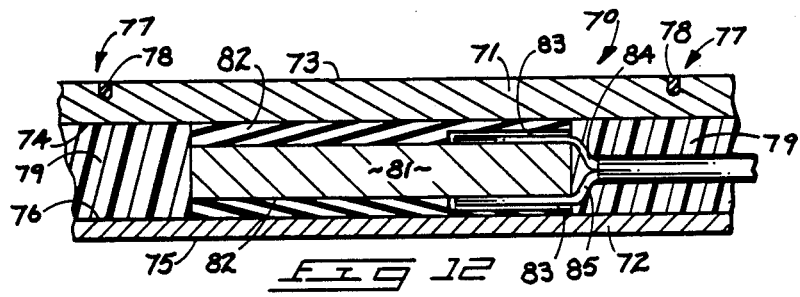
FIG. 12 is a sectional view showing the transducer assembly of FIG. 11 positioned with additional components including a ground contacting shoe and a hoof contacting backup plate to form another alternative embodiment of this invention.

FIGS. 11 and 12 show an alternative embodiment hoof force detection apparatus 70 according to this invention. Hoof force detection apparatus 70 includes a first shoe part 71 and a second shoe part 72. First shoe part 71 includes a ground-contacting surface 73 and an inside or sensor-contacting surface 74. The thickness of the shoe is represented as the distance between surfaces 73 and 74 in FIG. 12. Second shoe part 72 has a hoof-contacting surface 75 and an inside or sensor-contacting surface 76. First shoe part 71 is designed to be the ground contacting element of the entire assembly 70. Second shoe part 72 acts as a backup plate interposed between one or more piezoelectric assemblies 80 and the hoof of an animal (not shown). Piezoelectric assembly 80 is interposed between first and second shoe parts 71 and 72. The specific number of sensor assemblies 80 used is within the discretion of the user or manufacturer.

First and second shoe parts 71 and 72 are advantageously formed into a horseshoe shape or other appropriate shape for attachment to other types of hoofed animals. The planar configuration for hoof force detection apparatus 70 can be substantially similar to that shown in FIG. 13 for an alternative embodiment of this invention. Ground-contacting surface 73 is preferably formed to be essentially flat and approximately planar except for flexion joint grooves 77 formed transversely across the member on opposite sides of piezoelectric assembly 80.

Flexion joint grooves 77 are advantageously formed approximately one-half through the thickness of ground-contacting shoe part 71. Grooves 77 are typically approximately one-sixteenth to one-eighth inch (1.6 to 3.2 mm) in width. The specific width, depth and other geometrical parameters of grooves 77 are clearly variable depending upon a variety of factors, including the thickness of the shoe part 71; the strength, elasticity, and ductility of the material used to construct the shoe part; the weight of the animal; the force that is being applied through part; and other factors well known in mechanical design. Also relevant is the strength and resiliency of an interposed nonconductive filler material 79 which is preferably included between first and second shoe parts 71 and 72. Flexion joint grooves 77 are preferably filled with a water resistant, somewhat elastic filler material 78 to help exclude dirt, rock and other debris from impairing the design flexibility of the joints.

Piezoelectric sensor assembly 80 includes a piezoelectric element 81 and two appropriately shaped dielectric disks 82 positioned over opposing poled faces of piezoelectric element 81. Disks 82 advantageously include cut-out channels 83 for accommodating electrical leads 84 and 85. Leads 84 and 85 are preferably soldered or otherwise bonded to metallized or conductively coated poled surfaces of piezoelectric element 81.

FIG. 13 shows a still further alternative hoof force detection apparatus 90 according to this invention. Apparatus 90 includes a first ground-contacting shoe part 91 and a second or hoof-contacting shoe part 92. First and second shoe parts 91 and 92 have substantially similar planar configurations.

FIGS. 13 and 14 show that first shoe part 91 has a plurality of sensor apertures 93 formed therethrough. FIG. 13 shows three sensor apertures 93, although more or less are clearly possible and within the scope of this invention. Sensor apertures 93 receive, align and restrain a sensor protection cap 94. Sensor protection cap 94 preferably includes a beveled flange 95 which is advantageously beveled at approximately 45°. Beveled flange 95 interengages with a beveled receiving shoulder 96 formed in sensor apertures 93. FIG. 14 shows that an O-ring 97 or other seal can advantageously be interpositioned between flange 95 and receiving shoulder 96 in order to seal against migration of dirt and moisture.

The axial positioning of flange 95 on protective cap 94, and the positioning of receiving shoulder 96 within apertures 93 are coordinated so that the contacting surface 94a of sensor 94 extends beyond a contacting surface 91a of first shoe part 91 by an extension amount e in the range of approximately 0 - one-eighth inch (0-0.3 mm). It is most preferred that sensor cap contacting surfaces extend in the range of 0.010-0.025 inch (0.25-0.64 mm). This protrusion of the sensor contact surface has been found to be sufficient to properly load the sensor cap and underlying piezoelectric assembly 100 without creating a tripping hazard for the animal wearing apparatus 90.

Underlying protective cap 94 are remaining portions of piezoelectric assembly 100 including a piezoelectric element 101 sandwiched between complementary dielectric disks 102. Lead wires 103 and 104 are connected to opposing planar poled surfaces of piezoelectric element 101. Lead wires 103 and 104 are joined into a cable 105 which is conveniently routed through a channel 106 formed in first shoe part 91. Piezoelectric assembly 100 also preferably includes a nonconductive envelope 113 which surround and mechanically supports the sensor assembly against lateral motion within sensor receiving apertures 93.

First shoe part 91 further includes flexion joint grooves 108 extending transversely across first shoe part 91 opening to the ground-contacting surface 91a. Flexion joint grooves 108 cause the remaining web or connection 109 of first shoe part 91 to form a flexion joint at both sides of sensor assembly 100. Flexion joints 110 define a sensor mounting section 111 therebetween. Flexion joints 110 have greater mechanical flexibility than remaining sectional portions of first shoe part 91. This allows the sensor mounting section 111 to flex with respect to remaining portions of first shoe part 91 in response to forces applied between the animal and the surface upon which the force detection apparatus 90 is pressed.

Second shoe part 92 is positioned to act as a backup plate to the piezoelectric sensor assembly 100. Backup plate 92 is interpositioned between the inside surface 91b of first shoe part 91 and the hoof 112 upon which apparatus 90 is mounted. Backup plate 92 is also interpositioned between the second dielectric disk 102 and the animal hoof 112. Otional liners or pads (not shown) can be used between hoof 112 and backup plate 92.

The apparatuses described above are advantageously used to measure vertical forces applied through the hoof shoe structure. Such forces can also be termed the perpendicular or normal contact forces. The normal contact forces may not always be vertical. The ability of the poled ceramic piezoelectric elements to selectively detect forces normal to the poled surfaces allows this selective measurement of force without confusion from widely varying lateral forces.

The output signal from piezoelectric elements 36, 81, and 101 produce an electrical charge flow or current which is directly proportional to the change in force applied across poled faces of these elements, substantially normal thereto. This relationship between change in charge and change in force can be further developed mathematically to produce the relationship that the instantaneous force is equal to the integral of the piezoelectric element current over time from a time when applied force was zero or some other reference point. Changes in force can be both positive (increases) and negative (decreases) with associated positive and negative current associated therewith. Thus, at any point in time an integral of the current over time since a zero or other reference point will indicate the existing force upon the piezoelectric sensor elements.

Figure 15:
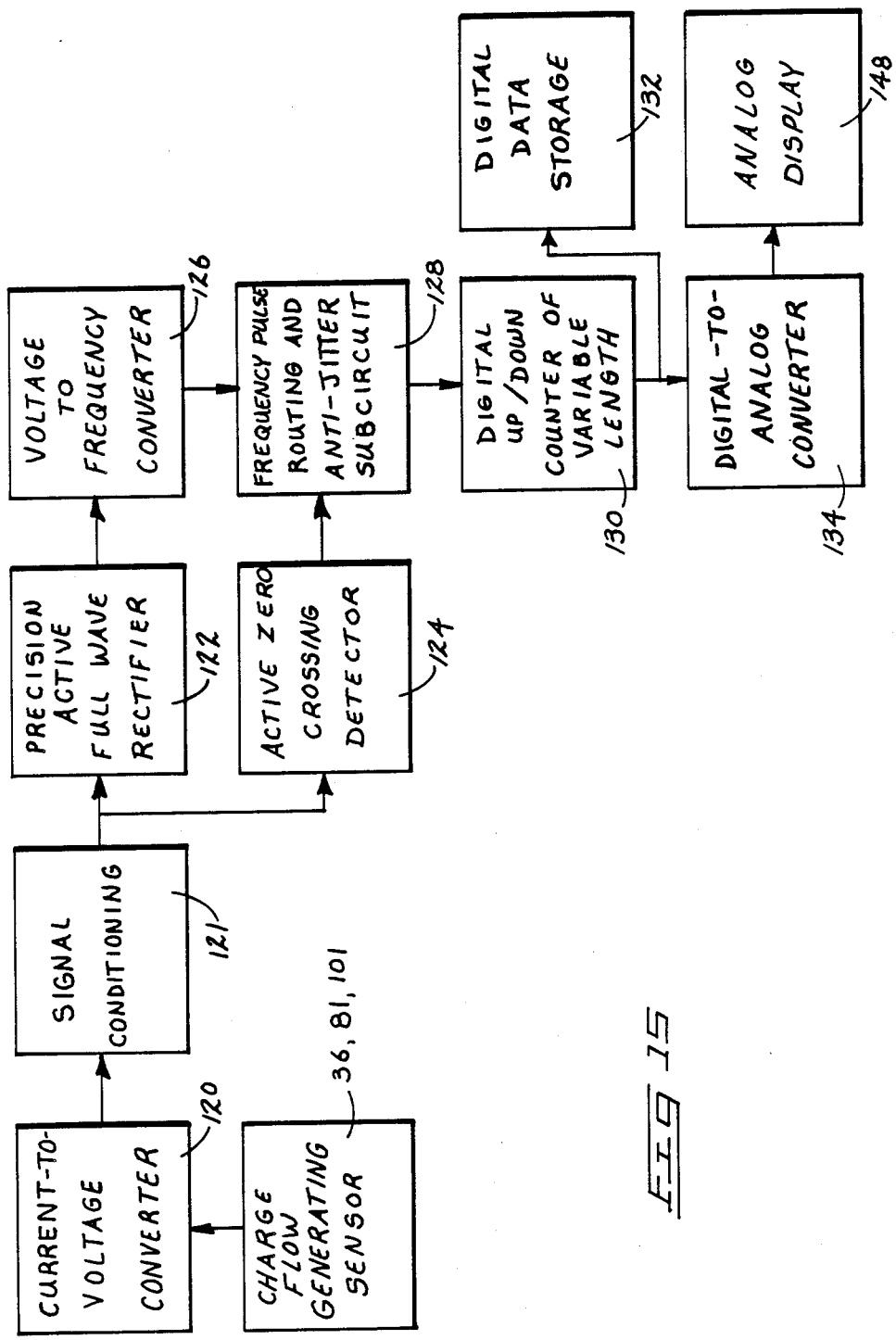
FIG. 15 is a block diagram showing functional portions of a preferred signal processing and digital integration circuit advantageously used in systems according to this invention.

FIG. 15 shows a preferred signal processing and digital force integrator according to this invention. FIG. 15 shows that the output current from a piezoelectric element or other charge flow generating sensor is input into a current-to-voltage converter 120. The voltage varying output produced by current-to-voltage converter 120 is input into a precision active full wave rectifier 122 which produces an absolute value for the instantaneous voltage signal value produced by converter 120. The output from current-to-voltage converter 120 also is input to an active zero crossing detector 124 which provides an output signal indicating whether the voltage signal output from converter 120 is positive or negative.

The absolute value output from precision active full wave rectifier 122 is input to a voltage-to-frequency converter 126. The output signal from voltage-to-frequency converter 126 is a stream of pulses or otherwise a time varying signal having a frequency rate which is linearly related to the absolute value voltage signal input thereto.

The output from voltage-to-frequency converter 126 is either directly input to a digital up/down counter or more preferably input through a frequency pulse routing and anti-jitter subcircuit 128. Subcircuit 128 preferably routes the absolute value voltage derived pulses from voltage-to-frequency converter 126 using the positive or negative indication produced by active zero crossing detector 124. Pulses are thus routed to digital up/down counter 130 to produce either a counting up or counting down integration.

Anti-jitter portions of subcircuit 128 cause the subcircuit to maintain routing either positive or negative until there are at least two pulses from voltage-to-frequency converter 126 having a changed polarity. This feature prevents unnecessary vacillation of the counter when force or other sensory input is not changing. Output from digital up/down counter 130 can be directly recorded in any suitable digital data storage device 132. Alternatively or additionally, the output from up/down counter 130 can be input to a digital-to-analog converter 134 for any desired analytical processing, recording or for use in an analog or other display 148 indicating hoof force or pressure in real time.

Figure 16A:
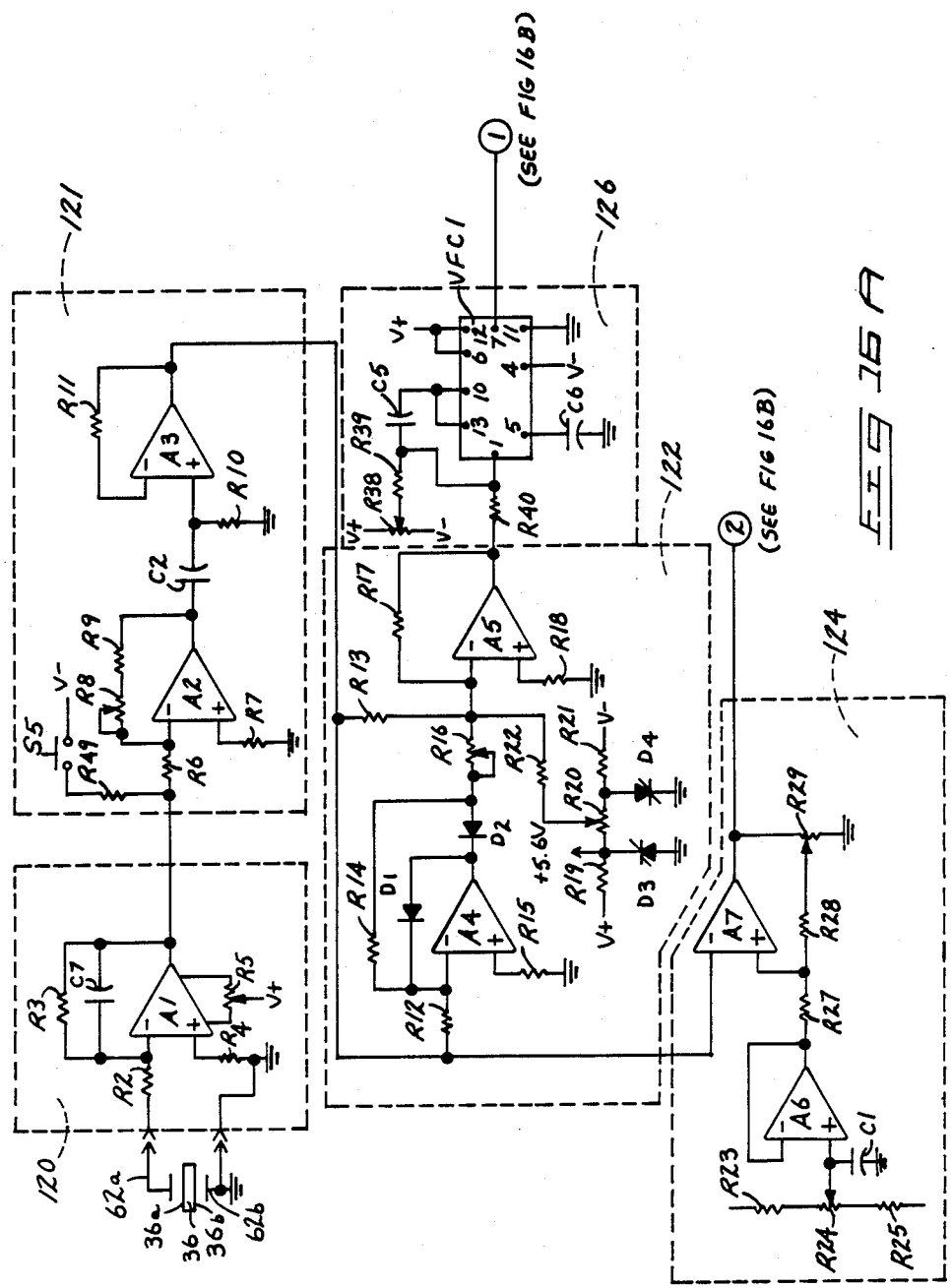
Figure 16C:
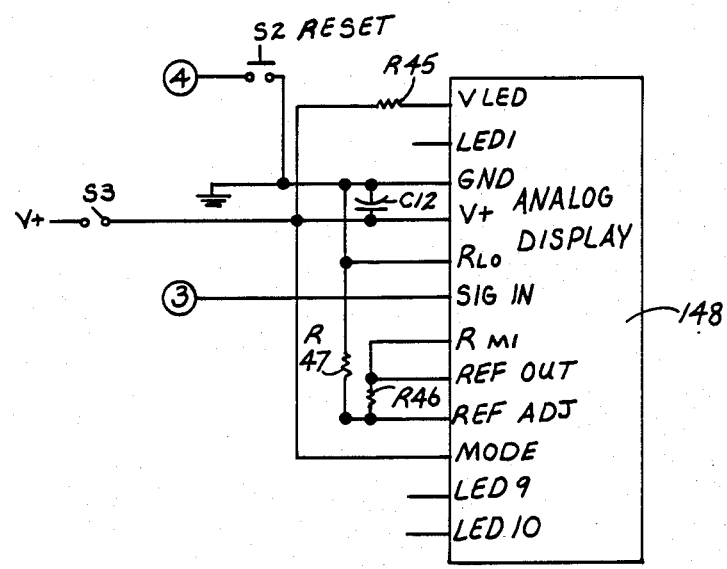

FIGS. 16A–16C show more specifically the electronic circuit components which are advantageously used in carrying out the signal processing and digital force integrator circuit more generally described with respect to FIG. 15.

FIG. 16A shows a piezoelectric element 36 having a positive pole 36a and negative pole 36b. Negative pole 36b is advantageously grounded. Positive pole 36a is connected to the minus terminal of operational amplifier A1 through resistor R2. A preferred value for resistor R2 and values for other components are shown in TABLE I below. Operational amplifier A1 is connected with the plus input grounded through resistor R4. Potentiometer R5 is connected to a positive general voltage input, V+, which is advantageously +9 volts. General negative voltage supply, V−, is similarly −9 volts. Potentiometer R5 is used to balance the operation of high impedance operational amplifier A1.

Feedback is provided from the output of A1 through parallel resistor R3 and capacitor C7 to the minus input thereof. The value of R3 can advantageously be 1 megaohm although the specific resistance is selected depending upon the type of sensor from which the charge flow or current signal is originating. The capacitance of capacitor C7 also varies depending upon the sensor used. Capacitance values for C7 may typically vary between 20 picofarads and 0.01 microfarad. Operational amplifier A1 and the related components discussed form current-to-voltage converter 120.

FIG. 16A also shows operational amplifiers A2 and A3. The function of operational amplifiers A2 and A3 is to amplify and condition the voltage varying signal produced by amplifier A1. The output from A1 is connected to the minus terminal of amplifier A2 through resistor R6. A test switch S5 is used to supply negative voltage V− through resistor R49 for diagnostic purposes. The feedback loop from the output of A2 includes resistor R9 and potentiometer R8. The plus input to amplifier A2 is connected to ground through resistor R7.

The output from A2 is passed through capacitor C2 and onto the plus input of operational amplifier A3. The plus input of operational amplifier A3 is also grounded through resistor R10. The feedback loop from the output of amplifier A3 is passed through resistor R11 to the minus input terminal thereof.

The conditioned voltage varying output from amplifier A3 is input to both active zero crossing detector 124 and precision active full wave rectifier 122. Precision active full wave rectifier 122 includes operational amplifiers A4 and A5 appropriately connected as shown with related components. The output of A3 is input through resistor R12 to the minus terminal of amplifier A4. The plus terminal of amplifier A4 is grounded through resistor R15. The output from amplifier A4 is connected to the anode of rectifying diode D1. The cathode of diode D1 is connectd to the minus input of A4. The output of A4 is also connected to the cathode of rectifying diode D2. The anode of diode D2 is connected to a potentiometer R16 and to the minus terminal of amplifier A4 through resistor R14. The output from potentiometer R16 is connected to the minus terminal of operational amplifier A5.

The minus terminal of amplifier A5 is also connected to the output from A3 via resistor R13. The minus terminal of operational amplifier A5 is also connected to resistor R22. The plus terminal of operational amplifier A5 is connected to ground through resistor R18. A feedback loop from the output of amplifier A5 is passed through resistor R17 to the minus terminal thereof.

Resistor R22 is also connected to a voltage supply subcircuit, including potentiometer R20, and zener diodes D3 and D4. Zener diodes D3 and D4 are connected with the anode and cathode thereof to ground, respectively. The opposite ends of diodes D3 and D4 are connected to opposing ends of the winding of potentiometer R20. A resistor R19 is connected to the cathode of D3 and to a +9 volt power supply. The opposite end of resistor R19 is connected to the V+ power supply. The anode of zener diode D4 is also connected to resistor R21. The opposite end of resistor R21 is connected to the minus 9 volt power supply.

The output from operational amplifier A5 is the absolute value of the voltage signal output from amplifier A3. This absolute value voltage varying signal is input to a voltage-to-frequency converter 126. Converter 126 includes integrated circuit VFC1 which receives the input signal via resistor R40. A wide variety of voltage-to-frequency converters are available and usable with this invention. Voltage-to-frequency converters having the fastest response time and widest dynamic range are preferred. The voltage-to-frequency converter is connected to positive and negative 9 or other appropriate voltage power supplies through potentiometer R38, resistor R39 and capacitor C5 as shown in FIG. 16A. Capacitor C6 is connected between VFC1 and ground. Other power supply connections can be made as indicated in FIG. 16A. The specific configuration used will depend upon the particular voltage-to-frequency converter included in systems built according to this invention.

The voltage signal from amplifier A3 is also input to operational amplifier A7 forming a part of active zero crossing detector 124. Active zero crossing detector 124 identifies whether the voltage signal from amplifier A3 is negative or positive and then provides an output from amplifier A7 which is indicative of whether the voltage signal is positive or negative.

Active zero crossing detector 124 includes operational amplifier A6 which is connected to the wiper of potentiometer R24 and to capacitor C1. The opposite plate of capacitor C1 is grounded. One side of the winding of potentiometer R24 is connected through resistor R23 to a +5.6 volt power supply. The opposite end of the winding is connected through resistor R25 to a −5.6 volt power supply. The output from amplifier A6 is fed back to the minus terminal thereof. A resistor R27 is connected between the output of amplifier A6 and the plus terminal of A7. The minus input to amplifier A7 is from the output of amplifier A3. The output of amplifier A7 is connected to the winding of R29, the opposite end of which is grounded. The wiper of potentiometer R29 is connected through resistor R28 back to the plus input terminal of amplifier A7.

The output from amplifier A7 is preferably connected to the frequency pulse routing and anti-jitter subcircuit 128 using resistors R31 and R32 of FIG. 16B. The opposite end of resistor R31 is connected to the cathode of diode D5. The anode of D5 is grounded. The opposite end of resistor R32 is connected to the cathode of diode D6. The anode of diode D6 is grounded. The output signal from amplifier A7 is passed through resistor R31 and on to inverter-amplifier I1. The output from amplifier A7 is also passed through resistor R32 and on to inverter-amplifiers I2 and I3 and further on to two J-K flip-flops FF1 and FF2 configured as a two step shift register. Flip-flops FF3 and FF4 are connected to the output from inverter I1 in a similar fashion, also creating a two step shift register.

The output from voltage-to-frequency converter VFC1 is communicated to flip-flops FF1–FF4 as shown in FIG. 16B to perform two step shift registration. The two outputs from the shift registers formed by flip-flops FF1–FF4 are input to inverting AND gates 140 and 141. The configuration of flip-flops, inverters, and resistors just described comprise the frequency pulse routing and anti-jitter subcircuit 128.

Frequency varying pulses from VFC1 are routed through inverting AND gate 140 when the voltage signal from amplifier A3 is positive, thus indicating the need for a positive count. When the voltage signal is negative from A3, the resulting frequency varying signal from voltage-to-frequency converter VFC1 is passed out through inverting AND gate 141 in order to produce a down or minus count. The outputs from inverting AND gates 140 and 141 are connected to three four bit up/down counters 142 which are cascaded to provide twelve bit counting capability. The output from counters 142 is a digital presentation indicating the integral of the sensor current on a real time basis. Digital output is taken from the outputs from up/down counters 142 shown at the righthand side thereof in FIG. 16B.

A digital-to-analog converter 144 is connected to the digital outputs from cascaded up/down counters 142 through inverters 143 as shown in FIG. 16B. Digital-to-analog converter 144 also is preferably connected to capacitor C29, resistor R41 and R43, potentiometers R42 and R44, and the negative and positive 9 volt power supplies as indicated in FIG. 16B in order to provide zero adjustment and span adjustments for the digital-to-analog converter. A variety of suitable digital-to-analog converters are useful in this invention.

The output of digital-to-analog converter 144 can be connected to a suitable display, such as display 148, to provide a visual indicator to the horse rider as to the intensity of the forces being applied by the hooves of the horse or other animal being tested. Display 148 is advantageously an analog, light-emitting diode display well known in the art. A preferred display 148 is connected as shown in FIG. 16C using resistors R45, R46, and R47 and capacitor C12. An on-off switch S3 is advantageously used to control power supply to display 148. A reset switch 52 can be used to reset counters 142.

FIG. 16B also shows inverter 151 connected to the output from inverting AND gate 141. The output from inverter 151 is input to OR gate 152, which is also connected to the output of inverter 153. The output of inverter 153 is normally low because the input is normally high because of the application of V+ through resistor R36. The output from OR gate 152 is input to NAND gate 155 which is configured together with NAND gate 156 to form an R-S flip flop. The other input to NAND gate 156 is from the most significant bit of counters 142. Output from NAND gate 156 is connected through resistor R34 to the base of transistor Q1. The emitter of Q1 is connected to ground and the collector is connected to light emitting diode LED1. Light LED1 is powered by positive voltage through resistor R33. Light LED1 is used to indicate when counters 142 have reached a maximum value and overflow can or has occurred.

The output from NAND gate 155 is connected to the cathode of diode D7. The anode of D7 is connected to a power source V+ through resistor R35. The anode of D7 is also connected to inverters 161 and 162 in series. The output from inverter 161 is connected to counters 142 in order to hold the count at the highest count possible during overflow conditions. The output of inverter 162 is connected to capacitor C3 which is further connected to the anode of diode D7.

Underflow conditions are similarly held at zero by an analogous circuit to the overflow circuit described above. The underflow circuit includes resistor R37 which is connected to capacitor C4, the input of inverter 182, and the anode of diode D9. The cathode of diode D9 is connected to the borrow terminal of counters 142 to detect the count at a minimum value of zero. The output from inverter 183 is connected to NAND gate 181. The other input to NAND gate 181 is normally held high by V+ through resistor R36. If the output of inverter 183 of reset switches S2 or S3 are activated, then the output from NAND gate 181 goes high and resets counters 142, preventing underflow.

The circuitry described can be reproduced and constructed to form a multichannel circuit useful for measuring hoof pressure from all hooves of an animal for recording or real time display.

The apparatus of this invention are used by assemblying the parts together and attaching the shoe force detector apparatus such as 20, 55, 70 or 90 onto the hoof of the animal in the well known fashion. The piezoelectric sensors such as 36 are connected to an appropriate signal amplification and integration circuit such as described above. The force detector apparatus is calibrated using a known applied force prior to mounting. The entire system is preferably battery powered, so that all parts can be used on a freely moving animal.

The systems of this invention are made according to well known manufacturing techniques using well known materials. The piezoelectric elements are preferably assembled with the shoe-transducer apparatus such that a preload is applied across the poled faces.

The signal amplification and integration circuitry described above and others according to this invention can be used with a variety of sensor types in addition to piezoelectric sensors. Specifically, such circuitries can be used to amplify and integrate a charge flow or current signal produced by capcitive sensors formed by two conductive materials which sense using a variable capacitance between the conductive materials. For example, two deformable foil layers having an interposed foam dielectric core which is deformable to change the capacitance at one or more points (subcircuits) formed by the capacitor. Such circuitries are also useful with moving coil and magnet position detectors which generate a current in response to relative motion therebetween. Also many voltage producing sensors can easily be transformed to a current flow having a suitably proportional varying output current so as to allow effective interpretation using the novel circuits according to this invention. Such alternative sensors and other suitable sensor types are connected as indicated for piezoelectric sensor 36 and with regard to proper polarity.

TABLE 1

| | VALUE |
|---|---|
| RESISTORS | |
| R2 | 470 ohm |
| R3 | 1 megaohm |
| R4 | 1 megaohm |
| R5 | 1 megaohm |
| R6 | 10 kilohm |
| R7 | 10 kilohm |
| R8 | 100 kilohm |
| R9 | 1 kilohm |
| R10 | 1 megaohm |
| R11 | 1 megaohm |
| R12 | 20 kilohm |
| R13 | 20 kilohm |
| R14 | 20 kilohm |
| R15 | 10 kilohm |
| R16 | 20 kilohm |
| R17 | 20 kilohm |
| R18 | 10 kilohm |
| R19 | 2.2 kilohm |
| R20 | 20 kilohm |
| R21 | 2.2 kilohm |
| R22 | 0.91 megaohm |
| R23 | 10 kilohm |
| R24 | 2 kilohm |
| R25 | 10 kilohm |
| R27 | 1 kilohm |
| R28 | 1 megaohm |
| R29 | 10 kilohm |
| R31 | 4.7 kilohm |
| R32 | 4.7 kilohm |
| R33 | 1 kilohm |
| R34 | 10 kilohm |
| R35 | 2.2 kilohm |
| R36 | 10 kilohm |
| R37 | 2.2 kilohm |
| R38 | 50 kilohm |
| R39 | 10 megaohm |
| R40 | 39 kilohm |
| R41 | 10 megaohm |
| R42 | 20 kilohm |
| R43 | 3.9 megaohm |
| R44 | 20 kilohm |
| R45 | 68 ohm |
| R46 | 10 kilohm |
| R47 | 47 kilohm |
| R49 | 1 megaohm |
| CAPACITORS | |
| C1 | 0.068 microfarads |
| C2 | 0.1 microfarads |
| C3 | 300 picofarads |
| C4 | 300 picofarads |
| C5 | 0.01 microfarads |
| C6 | 0.003 microfarads |
| C7 | 0.01 microfarads |
| C12 | 3.3 microfarads |
| C29 | 0.01 microfarads |

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A digital sensor circuit for indicating the real time condition of a sensor which produces a time variable current output which is indicative of a condition being sensed by the sensor, comprising:

means for converting time variable electrical current from the sensor into approximately proportional changes in voltage, to produce a time variable voltage signal;

means for producing an absolute value signal which is approximately proportional in value to an absolute value of said voltage signal;

means for detecting whether said voltage signal is positive or negative and electrical output means therefrom indicating whether said voltage signal is positive or negative;

means for producing a frequency variable signal having a frequency approximately proportional to the value of the absolute value signal; and digital counter means for counting cycles of the frequency variable signal; said counter means counting positively for cycles occurring during periods when the electrical current from the sensor flows in a first direction; said counter means counting negatively when the electrical current from the sensor flows in a second direction opposite to said first direction; the digital counter means registering an accumulated cycle count which is the integral of the electrical current from the sensor with time to thus indicate the real time condition of the sensor.

2. The digital sensor circuit of claim 1 further comprising display means for visually displaying information indicative of the accumulated cycle count and integrated current flow with time to thus indicate the real time condition of the sensor.

3. The digital sensor circuit of claim 1 further comprising:

digital-to-analog converter means; and display means for visually displaying information indicative of the accumulated cycle count and integrated current flow with time to thus indicate the real time condition of the sensor.

4. The digital sensor circuit of claim 1 further comprising:

anit-jitter means for requiring at least two cycles in the frequency variable signal to be of the same polarity prior to changing said digital counter means between a positive cycle counting mode and a negative cycle counting mode.

5. The digital sensor circuit of claim 1 further comprising:

signal conditioning circuit means for amplifying and conditioning the time variable voltage signal prior to producing said absolute value signal.

6. The digital sensor circuit of claim 1 wherein the means for producing an absolute value signal comprises a precision active full wave rectifier circuit.

7. The digital sensor circuit of claim 1 further comprising:

routing means connected to the electrical output means of the means for detecting whether the voltage signal is positive or negative, for routing the frequency variable signal to appropriate portions of the digital counter means;

anti-jitter means for requiring at least two cycles in the frequency variable signal to be of the same polarity prior to changing said digital counter means between a positive cycle counting mode and a negative cycle counting mode;

signal conditioning circuit means for amplifying and conditioning the time variable voltage signal prior to producing said absolute value signal.

8. A digital force indicating circuitry for use with a piezoelectric or other force detecting sensor having a time variable electrical current output signal which varies in approximate proportion to the rate of change in the force experienced by said sensor, comprising:

means for converting said time variable electrical current output signal from said sensor into approximately proportional changes in voltage, to produce a time variable voltage signal;

means for producing an absolute value signal which is approximately proportional in value to an absolute value of said voltage signal;

means for detecting whether said voltage is positive or negative and electrical output means therefrom indicating whether said voltage signal is positive or negative;

means for producing a frequency variable signal having a frequency approximately proportional to the value of said absolute value signal; and digital counter means for counting cycles of the frequency variable signal; said counter means counting positively for cycles occurring during periods when the electrical current from the sensor flows in a first direction; said counter means counting negatively when the electrical current from the sensor flows in a second direction opposite to said first direction; the digital counter means registering an accumulated cycle count which is the integral of the electrical current from said sensor over time to thus indicate the approximate real time force experienced by said sensor.

9. The digital force indicating circuitry of claim 8 further comprising display means for visually displaying information indicative of the real time force experienced by said sensor.

10. The digital force indicating circuitry of claim 8 further comprising:

anti-jitter means for requiring at least two cycles in the frequency variable signal to be of the saame polarity prior to changing said digital counter means between a positive cycle counting mode and a negative cycle counting mode.

11. The digital force indicating circuitry of claim 8 wherein the means for producing an absolute value signal comprises a precision active full wave rectifier circuit.

12. The digital force indicating circuitry of claim 8 further comprising:

routing means connected to the electrical output means of the means for detecting whether the voltage signal is positive or negative, for routing the frequency variable signal to appropriate portions of the digital counter means;

anti-jitter means for requiring at least two cycles in the frequency variable signal to be of the same polarity prior to changing said digital counter means between a positive cycle counting mode and a negative cycle counting mode;

signal conditioning circuit means for amplifying and conditioning the time variable voltage signal prior to producing said absolute value signal.

13. An electronic force detection system, comprising:
a piezoelectric sensor;

means for converting a time variable electrical current output signal from said sensor into approximately proportional changes in voltage, to produce a time variable voltage signal;

means for producing an absolute value signal which is approximately proportional in value to an absolute value of said voltage signal;

means for detecting whether said voltage signal is positive or negative and electrical output means therefrom indicating whether said voltage signal is positive or negative;

means for producing a frequency variable signal having a frequency approximately proportional to the value of said absolute value signal;

digital counter means for counting cycles of the frequency variable signal; said counter means counting positively for cycles occurring during periods when the electrical current from the sensor flows in a first direction; said counter means counting negatively when the electrical current from the sensor flows in a second direction opposite to said first direction; the digital counter means registering an accumulated cycle count which is the integral of the electrical current from said sensor over time to thus indicate the approximate real time force experienced by said sensor; and display means for displaying information indicative of force detected by said sensor.

14. The force detection system of claim 13 and further comprising:
anti-jitter means for requiring at least two cycles in the frequency variable signal to be of the same polarity prior to changing said digital counter means between a positive cycle counting mode and a negative cycle counting mode.

15. The force detection system of claim 13 and further comprising:
routing means connected to the electrical output means of the means for detecting whether the voltage signal is positive or negative, for routing the frequency variable signal to appropriate portions of the digital counter means;
anti-jitter means for requiring at least two cycles in the frequency variable signal to be of the same polarity prior to changing said digital counter means between a positive cycle counting mode and a negative cycle counting mode;
signal conditioning circuit means for amplifying and conditioning the time variable voltage signal prior to producing said absolute value signal.

* * * * *